US012143595B2

(12) United States Patent
Otsuka (10) Patent No.: US 12,143,595 B2
(45) Date of Patent: Nov. 12, 2024

(54) TRANSMISSION APPARATUS, RECEPTION APPARATUS, TRANSMISSION METHOD, RECEPTION METHOD, AND PROGRAM (71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 210 days.

(21) Appl. No.: 17/638,020

(22) PCT Filed: Aug. 28, 2020

(86) PCT No.: PCT/JP2020/032657
§ 371 (c)(1),
(2) Date: Feb. 24, 2022

(87) PCT Pub. No.: WO2021/044974
PCT Pub. Date: Mar. 11, 2021

(65) Prior Publication Data
US 2022/0279190 A1 Sep. 1, 2022

(30) Foreign Application Priority Data
Sep. 6, 2019 (JP) .................. 2019-163117

(51) Int. Cl.
*H04N 19/167* (2014.01)
*H04N 19/105* (2014.01)
(Continued)

(52) U.S. Cl.
CPC ........... *H04N 19/15* (2014.11); *H04N 19/105* (2014.11); *H04N 19/107* (2014.11);
(Continued)

(58) Field of Classification Search
CPC .... H04N 19/15; H04N 19/105; H04N 19/107; H04N 19/172; H04N 19/593;
(Continued)

(56) References Cited

U.S. PATENT DOCUMENTS 7,020,203 B1    3/2006 Horowitz
7,552,227 B2 *  6/2009 Wang .................. H04L 9/40
                                                   709/224

(Continued)

FOREIGN PATENT DOCUMENTS

JP    05252511 A    9/1993
JP    06253286 A    9/1994
(Continued)

OTHER PUBLICATIONS

Ye-Kui Wang, Gradual Decoder Refresh Using Isolated Regions, JVT-C074 (Year: 2002).*

(Continued)

*Primary Examiner* — Philip P. Dang
(74) *Attorney, Agent, or Firm* — Matthew B. Dernier, Esq.

(57) ABSTRACT

A transmission apparatus, a reception apparatus, a transmission method, a reception method, and a program by which whether or not a GDR technology is to be used can be suitably controlled according to a situation are provided. An acquisition unit sequentially acquires a frame image drawn in a frame buffer. A GDR usage determination unit determines, on the basis of the frame image or a communication situation, whether or not the GDR is to be used. An encode processing unit encodes, according to the determination as to whether or not the GDR is to be used, the frame image into any one of an ordinary I-frame and data including an I-slice in the GDR. A transmission unit transmits the I-frame or the data including an I-slice.

10 Claims, 6 Drawing Sheets (51) Int. Cl.
*H04N 19/107* (2014.01)
*H04N 19/15* (2014.01)
*H04N 19/172* (2014.01)
*H04N 19/174* (2014.01)
*H04N 19/423* (2014.01)

(52) U.S. Cl.
CPC ......... *H04N 19/172* (2014.11); *H04N 19/174* (2014.11); *H04N 19/423* (2014.11)

(58) Field of Classification Search
CPC .... H04N 21/234; H04N 21/02; H04N 19/174; H04N 19/423; H04N 19/137; H04N 19/11; H04N 19/04
See application file for complete search history.

(56) References Cited

U.S. PATENT DOCUMENTS

| | | | |
|---|---|---|---|
| 8,605,792 B2 | 12/2013 | Yamaguchi | |
| 8,831,095 B2 | 9/2014 | Koto | |
| 9,398,293 B2* | 7/2016 | Wang | H04N 19/31 |
| 9,491,457 B2* | 11/2016 | Wang | H04N 19/107 |
| 9,749,627 B2* | 8/2017 | Wu | H04N 19/105 |
| 9,906,815 B2* | 2/2018 | Srinivasan | H04N 19/107 |
| 9,930,345 B2* | 3/2018 | Toda | H04N 19/107 |
| 10,523,933 B2* | 12/2019 | Wu | H04N 19/70 |
| 10,638,147 B2* | 4/2020 | Hu | H04N 19/44 |
| 2002/0061184 A1 | 5/2002 | Miyamoto | |
| 2004/0260827 A1 | 12/2004 | Wang | |
| 2006/0056519 A1 | 3/2006 | Horowitz | |
| 2007/0030894 A1* | 2/2007 | Tian | H04N 19/176 375/240.27 |
| 2010/0189184 A1 | 7/2010 | Yamaguchi | |
| 2010/0246662 A1 | 9/2010 | Koto | |
| 2013/0089152 A1* | 4/2013 | Wang | H04N 19/187 375/240.23 |
| 2014/0153636 A1* | 6/2014 | Esenlik | H04N 19/176 375/240.02 |
| 2014/0218473 A1* | 8/2014 | Hannuksela | H04N 19/30 348/43 |

FOREIGN PATENT DOCUMENTS

| | | |
|---|---|---|
| JP | 08237666 A | 9/1996 |
| JP | 11289542 A | 10/1999 |
| JP | 2002158969 A | 5/2002 |
| JP | 2004215252 A | 7/2004 |
| JP | 2009105970 A | 5/2009 |
| JP | 2010232720 A | 10/2010 |
| WO | 2009044475 A1 | 4/2009 |

OTHER PUBLICATIONS

Notice of Reasons for Refusal for corresponding JP Application No. JP2021-543739, 10 pages dated Mar. 28, 2023.
International Search Report for corresponding PCT Application No. PCT/JP2020/032657, 9 pages, dated Oct. 13, 2020.

* cited by examiner

TRANSMISSION APPARATUS, RECEPTION APPARATUS, TRANSMISSION METHOD, RECEPTION METHOD, AND PROGRAM

TECHNICAL FIELD

The present invention relates to a transmission apparatus, a reception apparatus, a transmission method, a reception method, and a program.

BACKGROUND ART

A technology of setting a reference destination to compress the size of image data generated by encoding an image is known. For example, the size of image data obtained by encoding a frame image is smaller in a case where the frame image is encoded into a P-frame that requires a reference destination than a case where the frame image is encoded into an I-frame that does not require a reference destination.

Further, a technology of GDR (Gradual Decoder Refresh) is available. This technology encodes part of a frame image into an I-slice that corresponds to an I-frame and encodes the remaining part of the frame image into a P-slice that corresponds to a P-frame to suppress the variations in size of image data.

SUMMARY

Technical Problem

When encoding based on an ordinary I-frame and a P-frame is performed without using the GDR technology, the variations in size of image data becomes great. This makes fluctuation of the communication load great, and for example, the possibility that transmission of an I-frame having a large size and of a subsequent P-frame may be delayed or that such an I-frame and the subsequent P-frame may be missed increases.

On the other hand, if encoding using the GDR technology is performed, then, although the fluctuation of the communication load is small, there is a drawback that the entire image displayed is not switched immediately at a scene change.

The present invention has been made in view of such a situation as described above, and one of objects of the present invention resides in provision of a transmission apparatus, a reception apparatus, a transmission method, a reception method, and a program by which whether or not the GDR technology is to be used can be suitably controlled according to a situation.

Solution to Problem

In order to solve the subject described above, a transmission apparatus according to the present invention includes an acquisition unit that sequentially acquires a frame image drawn in a frame buffer, a determination unit that determines, on the basis of the frame image or a communication situation, whether or not GDR is to be used, an encode processing unit that encodes, according to the determination, the frame image into any one of an ordinary I-frame and data including an I-slice in the GDR, and a transmission unit that transmits the I-frame or the data including an I-slice.

In one mode of the present invention, the encode processing unit skips, in a case where the frame image is to be encoded into an ordinary I-frame, encoding of at least one of frame images next to the frame image.

In this mode, the encode processing unit may skip encoding of frame images of the number of frames which number is determined on the basis of a data size of the I-frame and a transferrable bandwidth.

Further, in one mode of the present invention, the transmission unit transmits the I-frame or the data including an I-slice at a data rate according to a transferrable bandwidth.

Further, in one mode of the present invention, the determination unit determines whether or not the GDR is to be used, on the basis of at least one of an amount of change in a scene from that of an immediately preceding frame image, the number of times by which missing of the I-frame or the data including an I-slice has occurred per unit period of time in a past, and the number of times by which the I-frame has been generated per unit period of time in the past.

Meanwhile, a reception apparatus according to the present invention includes a reception unit that receives image data from a transmission apparatus, a reception buffer that stores the image data, a decode processing unit that decodes the image data to generate an image, a display controlling unit that causes the image to be displayed, and a reception buffer controlling unit that secures, when the image data that is data including an I-slice in GDR is transmitted from the transmission apparatus, the reception buffer of a size with which displaying of the image does not underflow.

In this mode, the reception buffer controlling unit adjusts a capacity of the reception buffer on the basis of at least one of a transferrable bandwidth and a reception amount of an ordinary I-frame.

Meanwhile, a transmission method according to the present invention includes a step of sequentially acquiring a frame image drawn in a frame buffer, a step of determining, on the basis of the frame image or a communication situation, whether or not GDR is to be used, a step of encoding, according to the determination, the frame image into any one of an ordinary I-frame and data including an I-slice in the GDR, and a step of transmitting the I-frame or the data including an I-slice.

On the other hand, a reception method according to the present invention includes a step of receiving image data from a transmission apparatus, a step of decoding the image data to generate an image, a step of causing the image to be displayed, and a step of securing, when the image data that is data including an I-slice in GDR is transmitted from the transmission apparatus, a reception buffer of a size with which displaying of the image does not underflow, the reception buffer storing the image data.

Further, a program according to the present invention causes a computer to execute a procedure for sequentially acquiring a frame image drawn in a frame buffer, a procedure for determining, on the basis of the frame image or a communication situation, whether or not GDR is to be used, a procedure for encoding, according to the determination, the frame image into any one of an ordinary I-frame and data including an I-slice in the GDR, and a procedure for transmitting the I-frame or the data including an I-slice.

Meanwhile, another program according to the present invention causes a computer to execute a procedure for receiving image data from a transmission apparatus, a procedure for decoding the image data to generate an image, a procedure for causing the image to be displayed, and a procedure for securing, when the image data that is data including an I-slice in GDR is transmitted from the transmission apparatus, a reception buffer of a size with which displaying of the image does not underflow, the reception buffer storing the image data.

DESCRIPTION OF EMBODIMENT

Figure 1:
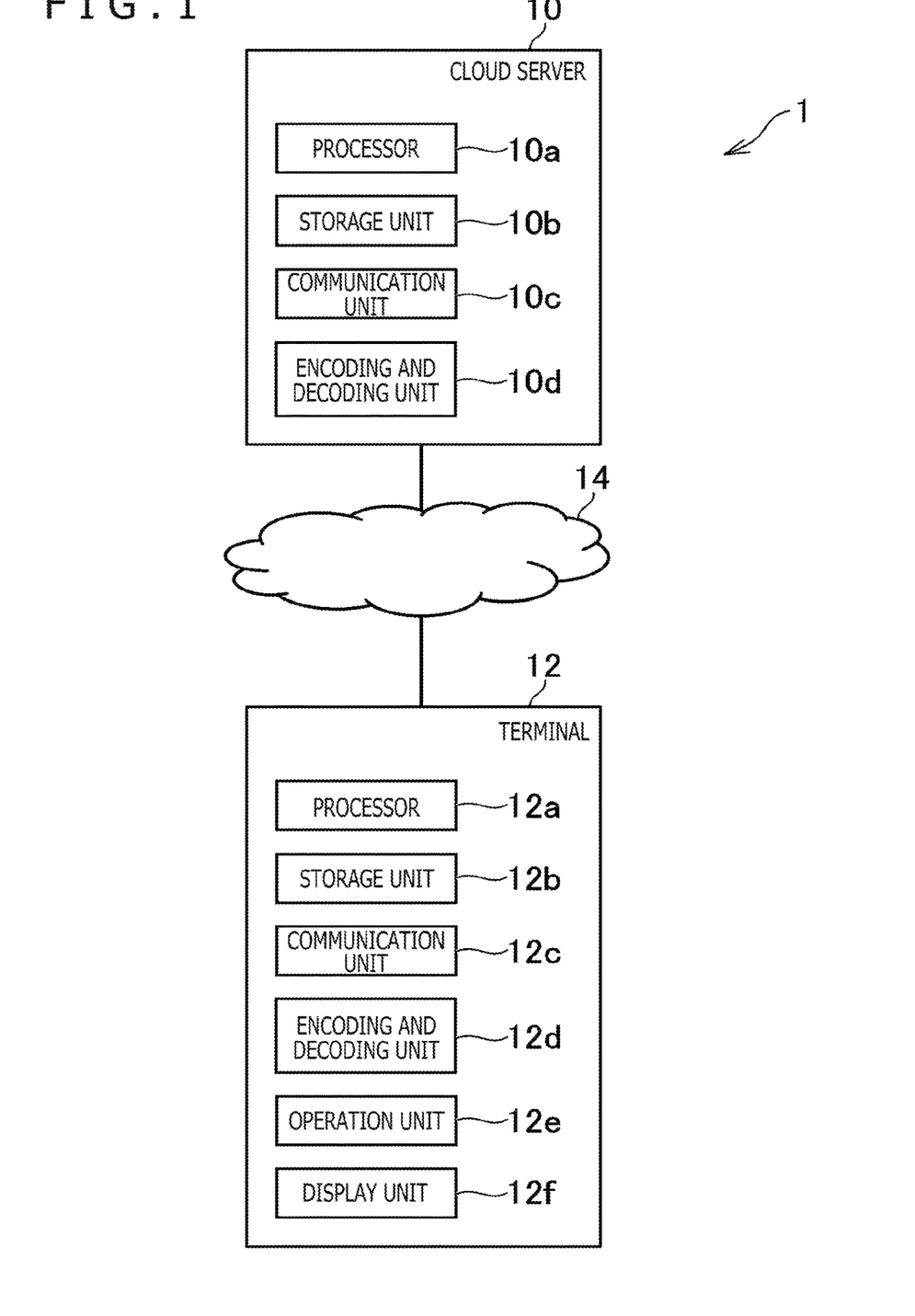
FIG. 1 is a view depicting an example of a general configuration of a cloud gaming system according to an embodiment of the present invention.

FIG. 1 is a view depicting an example of a general configuration of a cloud gaming system 1 according to an embodiment of the present invention. As depicted in FIG. 1, the cloud gaming system 1 according to the present embodiment includes a cloud server 10 and a terminal 12 each including a computer as a principal component. The cloud server 10 and the terminal 12 are connected to a computer network 14 such as the Internet such that the cloud server 10 and the terminal 12 can communicate with each other.

The cloud server 10 according to the present embodiment is, for example, a server computer that executes a program of a game relating to a cloud gaming service. The cloud server 10 delivers a moving image representative of a play situation of the game to the terminal 12 that is used by a user who is playing the game.

As depicted in FIG. 1, the cloud server 10 includes, for example, a processor 10a, a storage unit 10b, a communication unit 10c, and an encoding and decoding unit 10d.

The processor 10a is a program-controlled device such as a CPU (Central Processing Unit) and executes various information processes according to a program stored in the storage unit 10b. The processor 10a according to the present embodiment also includes a GPU (Graphics Processing Unit) for drawing an image in a frame buffer on the basis of a graphics command and data supplied from the CPU.

The storage unit 10b is a storage element, such as a ROM (Read Only Memory) or a RAM (Random Access Memory), or an SSD (Solid-State Drive), for example. In the storage unit 10b, a program to be executed by the processor 10a and so forth are stored. Further, in the storage unit 10b according to the present embodiment, a region for the frame buffer in which an image is drawn by the GPU included in the processor 10a is secured.

The communication unit 10c is a communication interface for transmitting and receiving data to and from a computer such as the terminal 12 through the computer network 14, for example.

The encoding and decoding unit 10d includes, for example, an encoder and a decoder. The encoder encodes an image inputted thereto, to generate image data representative of the image. Meanwhile, the decoder decodes image data inputted thereto and outputs an image represented by the image data.

The terminal 12 according to the present embodiment is a computer such as a game console, a personal computer, a tablet terminal, or a smartphone used by a user who uses, for example, a cloud gaming service.

As depicted in FIG. 1, the terminal 12 includes, for example, a processor 12a, a storage unit 12b, a communication unit 12c, an encoding and decoding unit 12d, an operation unit 12e, and a display unit 12f.

The processor 12a is a program-controlled device such as a CPU and executes various information processes according to a program stored in the storage unit 12b. The processor 12a according to the present embodiment includes also a GPU for drawing an image in a frame buffer on the basis of a graphics command and data supplied from the CPU.

The storage unit 12b is a storage element, such as a ROM or a RAM, or an SSD, for example. In the storage unit 12b, a program to be executed by the processor 12a and so forth are stored. Further, in the storage unit 12b according to the present embodiment, a region for the frame buffer in which an image is drawn by the GPU included in the processor 12a is secured.

The communication unit 12c is a communication interface for transmitting and receiving data to and from a computer such as the cloud server 10 through the computer network 14, for example.

The encoding and decoding unit 12d includes, for example, an encoder and a decoder. The encoder encodes an image inputted thereto, to generate image data representative of the image. Meanwhile, the decoder decodes image data inputted thereto and outputs an image represented by the image data.

The operation unit 12e is an operation member, for example, for performing an operation input to the processor 12a.

The display unit 12f is a display device such as a liquid crystal display or an organic EL (Electroluminescent) display.

It is to be noted that there is no necessity for the terminal 12 to include a GPU or a frame buffer.

If an operation relating to a game for the terminal 12 according to the present embodiment is performed through the operation unit 12e, then an operation signal representative of the operation is transmitted from the terminal 12 to the cloud server 10. Then, a game process according to the operation signal is executed by the cloud server 10. Then, a play image that is a frame image representative of a play situation of the game influenced by the operation signal is generated, and the play image is drawn in the frame buffer of the cloud server 10. In the present embodiment, the game process and generation of a play image are executed repeatedly.

Then, the cloud server 10 sequentially acquires a play image drawn in the frame buffer, to generate image data representative of the play image. Then, the cloud server 10 transmits the generated image data to the terminal 12. Then, the terminal 12 causes the display unit 12f to display a play image generated by decoding the image data received from the cloud server 10. In the present embodiment, a series of play images are displayed on the display unit 12f in such a manner.

The cloud server 10 according to the present embodiment can perform switching between encoding that uses the GDR technology and encoding that does not use the GDR technology.

Figure 2A:
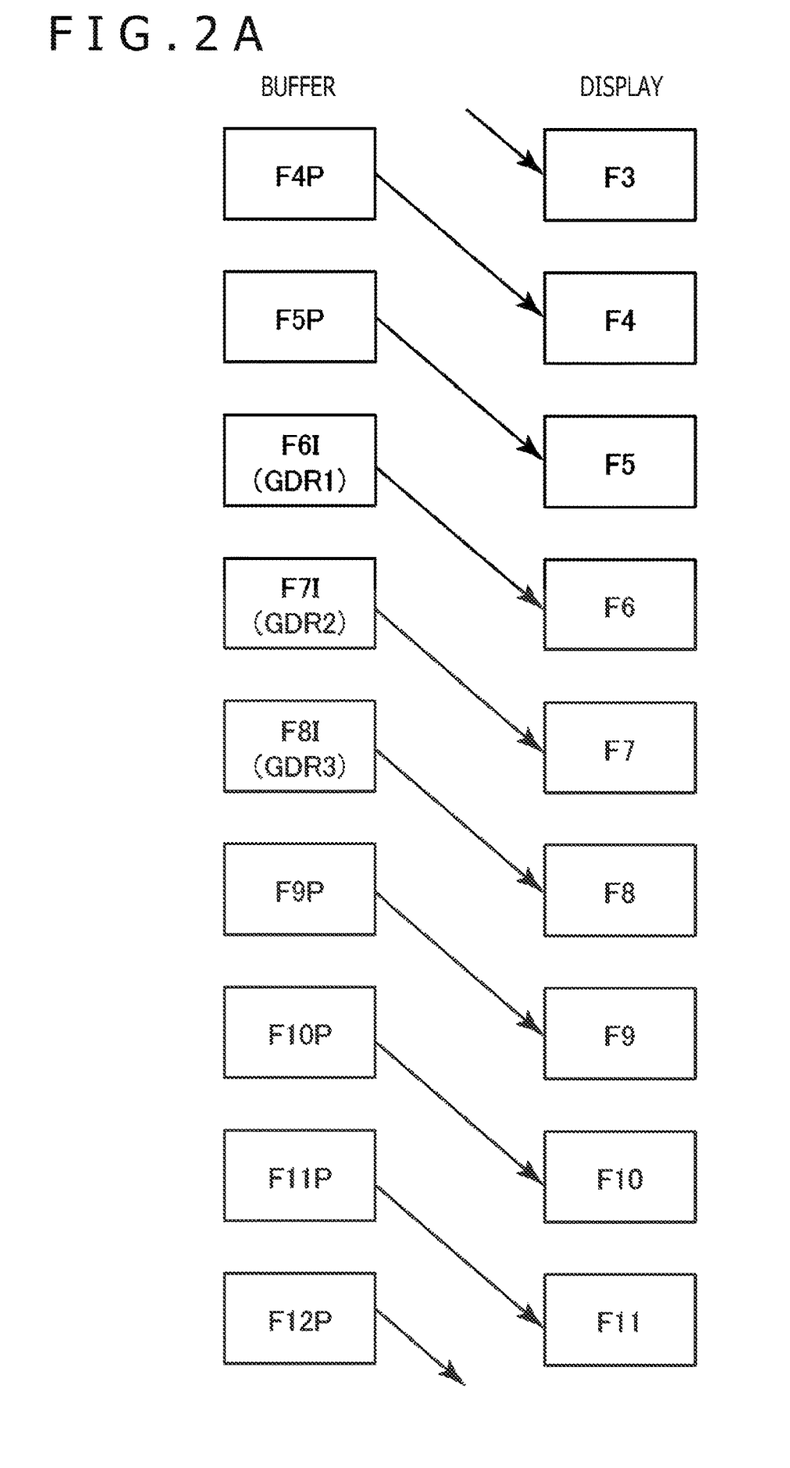
FIG. 2A is a view schematically depicting an example of a relation between image data received by a terminal and an image displayed on the terminal.
Figure 2B:
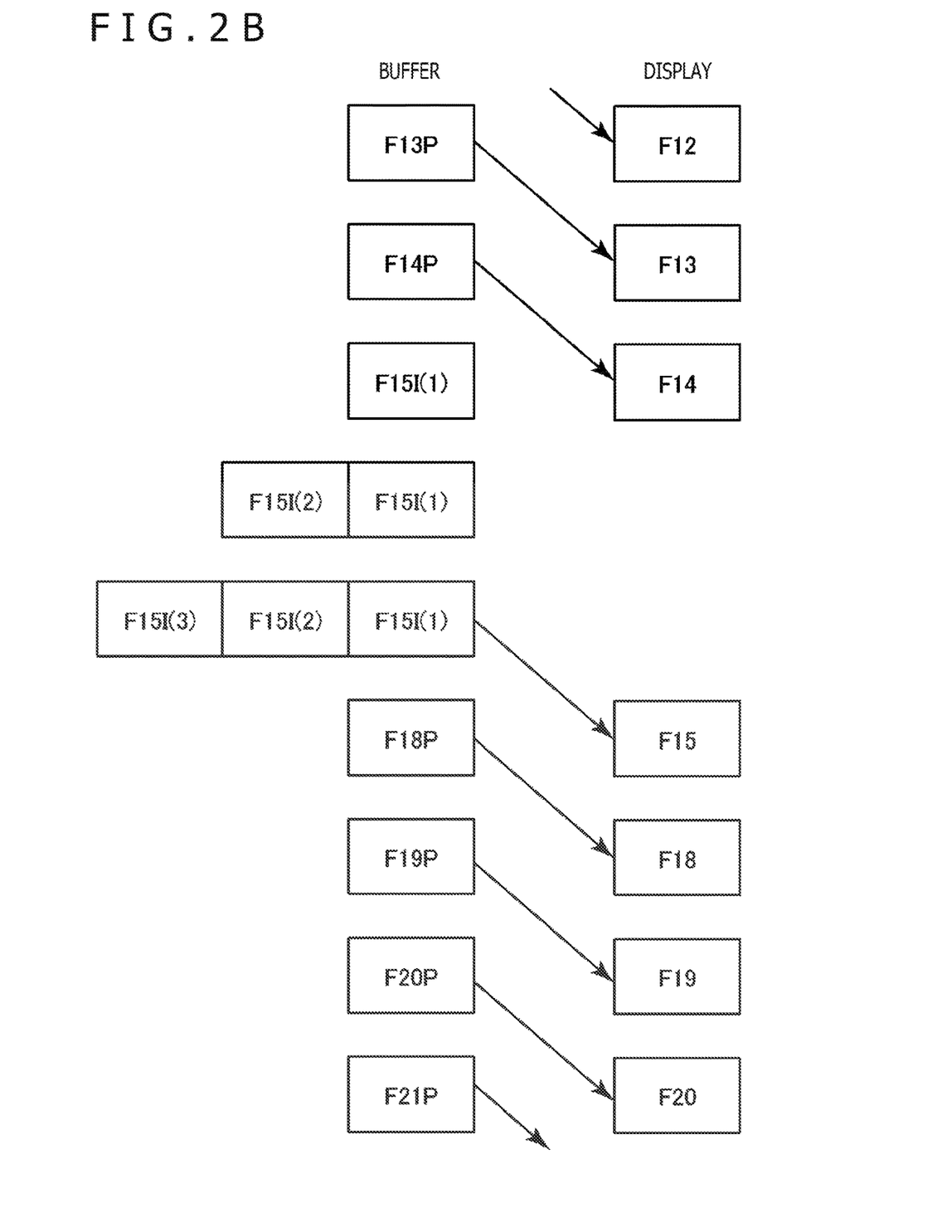
FIG. 2B is a view schematically depicting an example of a relation between image data received from a cloud server 10 by a terminal 12 and an image displayed.

FIGS. 2A and 2B are views each schematically depicting an example of a relation between image data received by the terminal 12 and an image displayed on the terminal 12. In FIGS. 2A and 2B, examples of third and subsequent images are depicted. In FIGS. 2A and 2B, the vertical direction represents lapse of time, and the downward direction corresponds to a time axis positive direction. Meanwhile, in FIG. 2B, time subsequent to the time depicted in FIG. 2A is depicted.

In this example, while the third play image (F3) is displayed, a P-frame (F4P) that is fourth image data stored in the reception buffer of the terminal 12 is decoded, to generate a fourth play image (F4). Then, while the decoded fourth play image (F4) is displayed, a P-frame (F5P) that is fifth image data stored in the reception buffer of the terminal 12 is decoded, to generate a fifth play image (F5).

Then, in this example, sixth image data to eighth image data are encoded using the GDR technology.

Figure 3A:
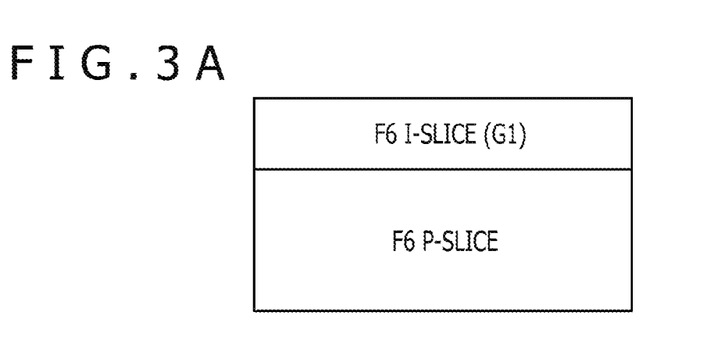
FIG. 3A is a view schematically depicting an example of a data structure of image data encoded using a GDR technology.

As depicted in FIG. 3A, in the sixth image data (F6I (GDR1)), an upper one-third portion is an I-slice (G1) corresponding to an I-frame while the remaining part is a P-slice corresponding to a P-frame. Then, while the decoded fifth frame (F5) is displayed, the sixth image data stored in the reception buffer of the terminal 12 is decoded, to generate a sixth play image (F6).

Figure 3B:
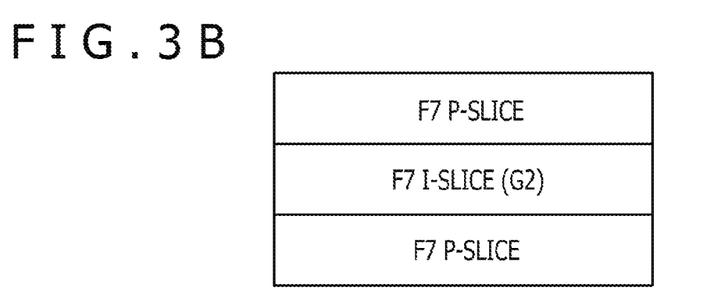
FIG. 3B is a view schematically depicting another example of a data structure of image data encoded using the GDR technology.

As depicted in FIG. 3B, in seventh image data (F7I (GDR2)), a middle one-third portion is an I-slice (G2) corresponding to an I-frame while the remaining part is a P slide corresponding to a P-frame. Then, while the decoded sixth frame (F6) is displayed, the seventh image data stored in the reception buffer of the terminal 12 is decoded, to generate a seventh play image (F7).

Figure 3C:
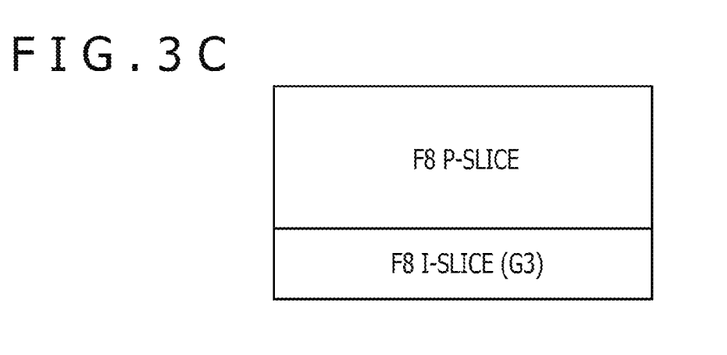
FIG. 3C is a view schematically depicting still another example of a data structure of image data encoded using the GDR technology.

As depicted in FIG. 3C, in the sixth image data (F8I (GDR3)), a lower one-third portion is an I-slice (G3) corresponding to an I-frame while the remaining part is a P-slice corresponding to a P-frame. Then, while the decoded seventh frame (F7) is displayed, the eighth image data stored in the reception buffer of the terminal 12 is decoded, to generate an eighth play image (F8).

In the following description, image data that includes an I-slice in the GDR like the sixth image data (F6I (GDR1)) to the eighth image data (F8I (GDR3)) is referred to as a GDR frame.

Then, while the eighth play image (F8) is displayed, a P-frame (F9P) that is ninth image data stored in the reception buffer of the terminal 12 is decoded, to generate a ninth play image (F9).

Thereafter, a 10th play image (f10) to a 14th play image (F14) are generated and displayed in a similar manner.

Then, while the 14th play image (F14) is displayed, I-frames (F15I(1) to F15I(3)) corresponding to 15th image data stored in the reception buffer of the terminal 12 are decoded, to generate 15th play image data (F15). The I-frames (F15I(1) to F15I(3)) have a large size of image data (in the example of FIG. 2B, three times larger than that of the image data of the P-frame), and much time is required for transmission of them. Therefore, displaying of the play image (F15) is delayed by a length of time corresponding to two frames.

Generally, since an I-frame has a size greater than that of image data that is encoded using the technology based on a P-frame or the GDR technology, the bit rate necessary for transmission is higher. Therefore, in a case where the bit rate necessary to transmit a bandwidth that can be transferred by the computer network 14 is exceeded, the possibility that transmission of the I-frame and of subsequent image data may be delayed or that the I-frame and the subsequent image data may be missed becomes higher.

Taking this into consideration, in the present embodiment, for example, if the transmission amount of image data increases in a surging manner by transmission of an I-frame to such a degree that it is expected to approach or exceed a transferrable bandwidth in one period, then encoding of at least one frame image next to a frame image having been encoded into the I-frame may be skipped. Here, encoding, for example, of 16th and 17th play images is skipped. Then, a P-frame (F18P) that is 18th image data is transmitted from the cloud server 10 to the terminal 12.

Then, in the present embodiment, while the 15th play image (F15) is displayed, the P-frame (F18P) that is the 18th image data stored in the reception buffer of the terminal 12 is decoded, to generate a 18th play image (F18).

Then, while the 18th play image (F18) is displayed, a P-frame (F19P) that is 19th image data stored in the reception buffer of the terminal 12 is decoded, to generate a 19th play image (F19). Thereafter, 20th and subsequent play images are generated in a similar manner.

It is to be noted that, during a period from the display of the 14th play image (F14) to the display of the 15th play image (F15) is displayed, the 14th play image (F14) may continuously be displayed or the display may black out. Further, in this case, the terminal 12 may generate an alternative image with use of the technology disclosed, for example, in Japanese Patent Application No. 2019-056321 or Japanese Patent Application No. 2019-056322 and may cause the display unit 12f to display the alternative image.

A technology which buffers in advance image data of a size corresponding to an I-frame in order to avoid underflow of the display when the terminal 12 receives an I-frame is available. According to the technology, an image preceding by several frames a frame image to be received is displayed. In the present embodiment, a reception buffer of a size with which, when a GDR frame is transmitted, the display does not underflow is secured in the terminal 12. Then, as a rule, a frame image of a frame immediately preceding the frame image to be received is displayed. Therefore, according to the present embodiment, the latency is lower than that of the technology of buffering in advance image data of a size corresponding to an I-frame. It is to be noted that, in the present embodiment, image data of a size corresponding to an I-frame may be buffered in advance in order to avoid the underflow.

Further, the terminal 12 may otherwise adjust the capacity (depth) of the reception buffer on the basis of at least one of the transferrable bandwidth and a reception amount of an ordinary I-frame (for example, at least one of the transferrable bandwidth and a reception amount of an ordinary I-frame during a predetermined period of time in the past). For example, in a case where the reception frequency of an ordinary I-frame is high, the terminal 12 may increase the depth of the reception buffer. Then, the terminal 12 may execute control for reducing the display delay by underflow even if the latency increases.

Further, if encoding based on an ordinary I-frame or P-frame is performed without using the GDR technology, then the variations in size of image data becomes great.

Therefore, the fluctuation of the communication load becomes great, and the possibility that transmission of an I-frame having a large size and of a subsequent P-frame may be delayed or that such an I-frame and the subsequent P-frame may be missed becomes higher as described hereinabove.

On the other hand, if encoding using the GDR is performed, then, although the fluctuation of the communication load is small, there is a drawback that, at a scene change, the entire image displayed is not switched immediately.

Taking this into consideration, according to the present embodiment, it is made possible to suitably control, according to a situation, whether or not the GDR technology is to be used, in the following manner.

In the following, functions of the cloud gaming system 1 according to the present embodiment and processes executed by the cloud server 10 are described further.

Figure 4:
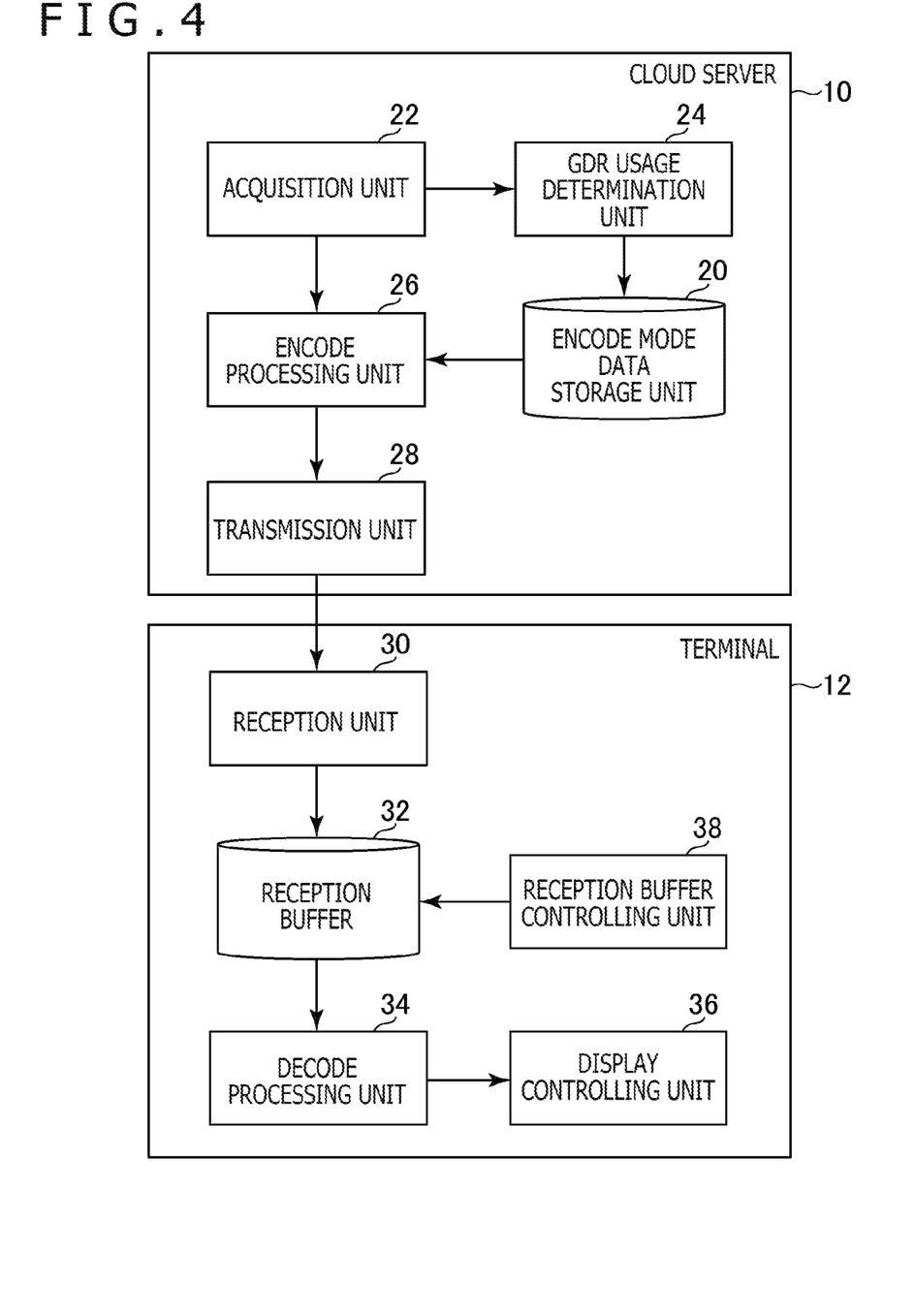
FIG. 4 is a functional block diagram depicting an example of functions incorporated in the cloud gaming system according to the embodiment of the present invention.

FIG. 4 is a functional block diagram depicting an example of functions incorporated in the cloud gaming system 1 according to the present embodiment. It is to be noted that not all of the functions depicted in FIG. 4 need to be incorporated in the cloud gaming system 1 according to the present embodiment. Further, functions other than the functions depicted in FIG. 4 (for example, a function for execution of game processing or generation of a play image based on an operation signal or the like) may be incorporated in the cloud gaming system 1.

As depicted in FIG. 4, the cloud server 10 according to the present embodiment functionally includes, for example, an encode mode data storage unit 20, an acquisition unit 22, a GDR usage determination unit 24, an encode processing unit 26, and a transmission unit 28.

The encode mode data storage unit 20 is implemented including the storage unit 10b as a principal component. The acquisition unit 22 and the encode processing unit 26 are implemented including the encoding and decoding unit 10d as a principal component. The GDR usage determination unit 24 is implemented including the processor 10a as a principal component. The transmission unit 28 is implemented including the communication unit 10c as a principal component.

The functions described above are implemented by execution by the processor 10a of a program installed in the cloud server 10 that is a computer, the program including instructions corresponding to the functions described above. This program is supplied to the cloud server 10 through a computer-readable information storage medium such as an optical disk, a magnetic disk, a magnetic tape, a magneto-optical disk, or a flash memory or through the Internet, for example.

As depicted in FIG. 4, the terminal 12 according to the present embodiment functionally includes, for example, a reception unit 30, a reception buffer 32, a decode processing unit 34, a display controlling unit 36, and a reception buffer controlling unit 38.

The reception unit 30 is implemented including the communication unit 12c as a principal component. The reception buffer 32 is implemented including the storage unit 12b as a principal component. The decode processing unit 34 is implemented including the encoding and decoding unit 12d as a principal component. The display controlling unit 36 is implemented including the processor 12a and the display unit 12f as principal components. The reception buffer controlling unit 38 is implemented including the processor 12a as a principal component.

The functions described above are implemented by execution by the processor 12a of a program installed in the terminal 12 that is a computer, the program including instructions corresponding to the functions described above. This program is supplied to the terminal 12 through a computer-readable information storage medium such as an optical disk, a magnetic disk, a magnetic tape, a magneto-optical disk, or a flash memory or through the Internet, for example.

In the present embodiment, the encode mode data storage unit 20 stores encode mode data indicative of whether or not the GDR is to be used, for example. Here, it is assumed that, for example, the encode mode data has the value of 1 or 0.

In the present embodiment, the acquisition unit 22 sequentially acquires a frame image (in the example described hereinabove, a play image) drawn in the frame buffer, for example.

In the present embodiment, the GDR usage determination unit 24 determines whether or not the GDR is to be used, on the basis of a frame image acquired by the acquisition unit 22 or a communication situation in the computer network 14, for example.

Here, the GDR usage determination unit 24 may determine whether or not the GDR is to be used on the basis of an amount of change in a scene from that of an immediately preceding frame image. For example, the GDR usage determination unit 24 may determine that the GDR is not to be used in a case where the value indicative of the amount of change in a scene is higher than a predetermined value, but otherwise, may determine that the GDR is to be used.

Here, as the value indicative of the amount of change in a scene, for example, an index value indicative of a degree of difference or a degree of similarity between an immediately preceding frame image and the frame image in question may be used. For example, in a case where the PSNR (Peak Signal to Noise Ratio) or the SSIM (Structural Similarity) is lower than a predetermined value, it may be determined that the GDR is not to be used, but otherwise, it may be determined that the GDR is to be used. As an alternative, as the amount of change in a scene, an amount of change in ME (Motion Estimation) may be used. For example, it may be determined that the GDR is not to be used in a case where the value of the amount of change in ME is higher than a predetermined value, but otherwise, it may be determined that the GDR is to be used. As another alternative, as the value indicative of the amount of change in a scene, a value indicative of a degree of discontinuity of audio between a timing at which an immediately preceding frame image is displayed and a timing at which a frame image of the frame in question is displayed may be used. For example, in the case where the value is higher than a predetermined value, it may be determined that the GDR is not to be used, but otherwise, it may be determined that the GDR is to be used.

As an alternative, whether or not the GDR is to be used may be determined on the basis of the amount of change in a score value indicative of contents represented by a frame image derived on the basis of a predetermined rule. For example, use of GDR may be determined on the basis of the amount of change in a score value calculated from such information as whether or not the current point of time is a scene switching timing, a type of an image texture represented by a frame, distribution of feature points, depth information, an amount of objects, a use amount of each of levels of mipmap textures used in three-dimensional graphics, an LOD (Level Of Detail), a use amount of each of levels of tessellations, an amount of letters and symbols, a type of a scene represented, and so forth. Here, for example, a score value indicative of a degree of priority of the degree of spatial details and the degree of time details may be calculated.

As another alternative, the GDR usage determination unit 24 may determine whether or not the GDR is to be used on the basis of the transferrable bandwidth in the computer network 14 at the present point of time. For example, in a case where the value indicative of the transferrable bandwidth is higher than a predetermined value, it may be determined that the GDR is not to be used, but otherwise, it may be determined that the GDR is to be used. It is considered that, in a case where the transferrable bandwidth has some room, even if an ordinary I-frame is transmitted, this does not matter so much. Further, if the transferrable bandwidth is sufficient, then the skipping of encoding of a frame image after an ordinary I-frame is transmitted can be omitted. Therefore, also from this point of view, in a case where the transferrable bandwidth has some room, even if an ordinary I-frame is transmitted, this does not matter very much.

As still another alternative, the GDR usage determination unit 24 may determine whether or not the GDR is to be used on the basis of the number of times by which missing of image data has occurred per unit period of time in the past or the number of times by which an I-frame has been generated per unit period of time in the past. For example, in a case where the number of times by which missing of image data has occurred per unit period of time during a most recent, predetermined period of time is greater than a predetermined number of times, it may be determined that the GDR is to be used, but otherwise, it may be determined that the GDR is not to be used. Else, in a case where the number of times by which an I-frame has been generated per unit period of time during a most recent, predetermined period of time is greater than a predetermined number of times, it may be determined that the GDR is to be used, but otherwise, it may be determined that the GDR is not to be used.

If the number of times of transfer of an I-frame increases in a situation in which the transfer bandwidth is insufficient, then the frame rate is made discontinuous due to unintended missing of data caused by an excessive transfer amount or due to an intended skipping of transmission of image data after an I-frame. As a result, the smoothness in reproduction of a moving image on the terminal 12 decreases, and the user experience degrades. In such a case as just described, even if the amount of change in a scene is great, securing smoothness of the frame rate by using the GDR may be prioritized over performing reproduction in high picture quality by using an I-frame.

As yet another alternative, the GDR usage determination unit 24 may determine whether or not the GDR is to be used, with use of a machine learning model such as deep learning.

As a further alternative, the GDR usage determination unit 24 may combine some or all of the measures described above and determine whether or not the GDR is to be used on the basis of a comprehensive evaluation value of the combination.

The GDR usage determination unit 24 updates the encode mode data stored in the encode mode data storage unit 20, for example, according to a determination as to whether or not the GDR is to be used. For example, when it is determined that the GDR is to be used in a case where the value of the encode mode data is 0, the encode mode data is updated so as to have the value of 1. On the other hand, for example, when it is determined that the GDR is not to be used in a case where the value of the encode mode data is 1, the encode mode data is updated so as to have the value of 0.

In the present embodiment, the encode processing unit 26 generates image data by encoding a frame image acquired by the acquisition unit 22, for example. Here, for example, in a situation in which the frame image is encoded into any one of an ordinary I-frame and the GDR frame described hereinabove, the encode processing unit 26 encodes the frame image into any one of an ordinary I-frame and the GDR frame, according to a determination as to whether or not the GDR is to be used.

For example, in a case where the encode mode data stored in the encode mode data storage unit 20 is 1, the encode processing unit 26 encodes the frame image into a GDR frame. On the other hand, for example, in a case where the encode mode data stored in the encode mode data storage unit 20 is 0, the encode processing unit 26 encodes the frame image into an ordinary I-frame.

Further, in a case where the frame image is to be encoded into an ordinary I-frame, the encode processing unit 26 may skip encoding of at least one frame image next to the frame image in question as described hereinabove. Here, the encode processing unit 26 may skip encoding of frame images of the number of frames determined on the basis of the data size of an ordinary I-frame and the transferrable bandwidth specified by the transmission unit 28.

In the present embodiment, the transmission unit 28 transmits image data generated by the encode processing unit 26 to the terminal 12, for example. Here, the transmission unit 28 may specify the transferrable bandwidth by monitoring the communication situation of the computer network 14. Then, the transmission unit 28 may transmit the image data at a data rate according to the specified transferrable bandwidth to the terminal 12.

In the present embodiment, the reception unit 30 receives image data from a transmission apparatus, for example.

In the present embodiment, the reception buffer 32 stores image data received by the reception unit 30, for example.

In the present embodiment, the decode processing unit 34 generates a play image by decoding image data stored in the reception buffer 32, for example.

In the present embodiment, the display controlling unit 36 causes a play image generated by the decode processing unit 34 to be displayed, for example.

In the present embodiment, the reception buffer controlling unit 38 controls the size of the reception buffer 32, for example. The reception buffer controlling unit 38 secures the reception buffer 32 of a size with which the display of a play image does not underflow, for example, when a GDR frame is transmitted from the cloud server 10.

Here, the reception buffer controlling unit 38 may adjust the capacity of the reception buffer 32 on the basis of at least one of the transferrable bandwidth and the reception amount of an ordinary I-frame. For example, the reception buffer controlling unit 38 may adjust the capacity of the reception buffer 32 on the basis of at least one of the transferrable bandwidth and the reception amount of an ordinary I-frame during a predetermined period of time in the past.

Figure 5:
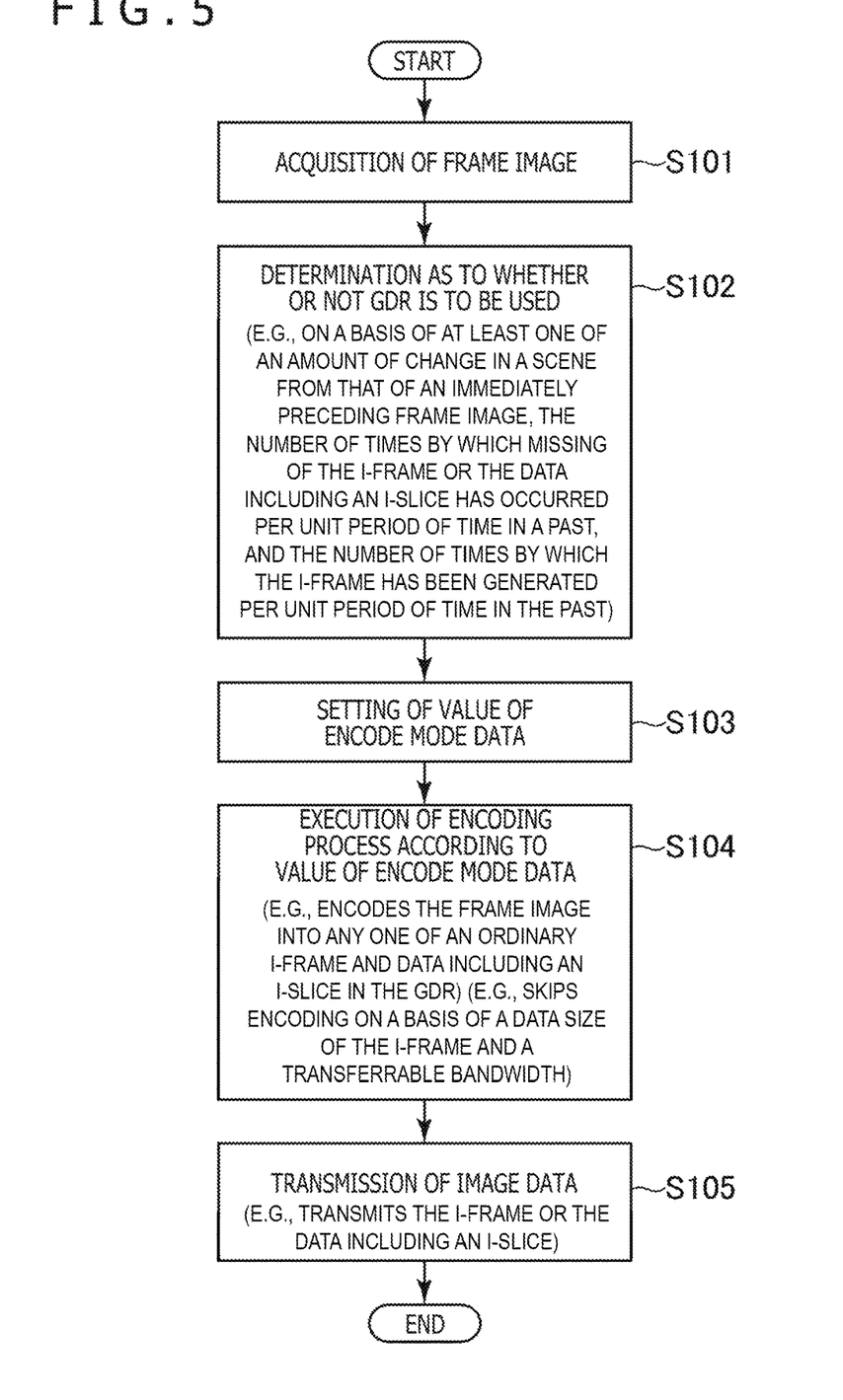
FIG. 5 is a flow chart depicting an example of a flow of processing performed in a cloud server according to the embodiment of the present invention.

Here, an example of a flow of processing executed by the cloud server 10 according to the present embodiment is described with reference to a flow chart exemplified in FIG. 5. Processes indicated in S101 to S105 depicted in FIG. 5 are executed repeatedly at a fixed or variable frame rate.

First, the acquisition unit 22 acquires a frame image of a frame drawn in the frame buffer (S101).

Then, the GDR usage determination unit 24 determines whether or not the GDR is to be used in such a manner as described above (S102).

Then, the GDR usage determination unit 24 sets a value of the encode mode data stored in the encode mode data storage unit 20, according to the determination made by the process indicated in S102 as described hereinabove (S103). In a case where it is determined that the GDR is to be used, the value of the encode mode data stored in the encode mode data storage unit 20 is set to 1. In a case where it is determined that the GDR is not to be used, the value of the encode mode data stored in the encode mode data storage unit 20 is set to 0.

Then, the encode processing unit 26 generates image data by executing, for the frame image acquired by the process indicated in S101, an encode process according to the value of the encode mode data stored in the encode mode data storage unit 20 (S104).

For example, it is assumed that the value of the encode mode data stored in the encode mode data storage unit 20 is 0. In this case, when deciding that the frame image is to be encoded into an I-frame, the encode processing unit 26 encodes the frame image into an ordinary I-frame.

On the other hand, it is assumed that the value of the encode mode data stored in the encode mode data storage unit 20 is 1. In this case, when deciding that the frame image is to be encoded into an I-frame, the encode processing unit 26 encodes the frame image into image data that includes an I-slice (for example, into the GDR frame described hereinabove).

Here, in a case where the image data of the immediately preceding frame does not include an I-slice, image data (GDR1) in which an upper one-third portion is an I-slice (G1) corresponding to an I-frame and the remaining portion is a P-slice corresponding to a P-frame is generated. In a case where the image data of the immediately preceding frame is GDR1, image data (GDR2) in which a middle one-third portion is an I-slice (G2) corresponding to an I-frame and the remaining portion is a P-slice corresponding to a P-frame is generated. In a case where the image data of the immediately preceding frame is GDR2, image data (GDR3) in which a lower one-third portion is an I-slice (G3) corresponding to an I-frame and the remaining portion is a P-slice corresponding to a P-frame is generated.

It is to be noted that, when deciding that the frame image is to be encoded into a P-frame irrespective of the value of the encode mode data stored in the encode mode data storage unit 20, the encode processing unit 26 encodes the frame image into an ordinary P-frame.

Then, the transmission unit 28 transmits the image data generated by the process indicated in S104 to the terminal 12 (S105) and returns its processing to the process indicated in S101.

According to the present embodiment, whether or not the GDR is to be used can be controlled suitably according to a situation in such a manner as described above.

Further, in the present embodiment, it is possible to normally use the GDR technology and transmit an ordinary I-frame only in a predetermined case such as a case in which the amount of change in a scene is great, in such a manner as described above. Further, in the present embodiment, it is possible to quickly converge a surge wave of transmitted image data generated by transmission of an ordinary I-frame by skipping encoding of a subsequent frame. Further, in the present embodiment, it is possible not to use the technology of buffering image data of a size corresponding to an I-frame in advance, in order to avoid display from underflowing when the terminal 12 receives an I-frame as described hereinabove. Therefore, according to the present embodiment, it is possible to reduce display delay of a play image on the terminal 12.

It is to be noted that the present invention is not limited to the embodiment described above.

For example, in the present embodiment, in a case where the number of times by which missing of image data has occurred per unit period of time in the past is greater than a predetermined number of times, the frequency with which image data including an I-slice in place of a P-frame (for example, the GDR frame described hereinabove) is transmitted may be increased. For example, in a case where the number of times by which missing of image data has occurred per unit period of time during a most recent, predetermined period of time is greater than a predetermined number of times, the frequency with which image data including an I-slice in place of a P-frame (for example, the GDR frame described hereinabove) is transmitted may be increased.

Further, although, in the example described hereinabove, in a case where the GDR technology is used, one I-frame is divided into three and a GDR frame in which one-third is an I-slice is transmitted over three frames, the division of an I-frame is not limited to the division into three. For any n, after one I-frame is divided into n, a GDR frame in which one-nth is an I-slice may be transmitted over n frames.

Further, the present embodiment can also be applied to a situation in which encoding or transmission of image data by a slice transfer method by which one frame image is divided into and transmitted as a plurality of portions is performed. In the slice transfer method, the I-frame in the foregoing description is transmitted for every I-slice. The P-frame in the foregoing description is transmitted for every P-slice. In the GDR frame in the foregoing description, in the example described hereinabove, one-third is transmitted for every slice that corresponds to an I-frame.

Further, the application range of the present invention is not limited to the cloud gaming system 1. For example, the present invention can also be applied to a game system that includes a server placed in a home and a terminal connected to the server through a home network, a public network, a carrier network for a portable telephone, or the like. In other words, the computer network 14 may be a home network, a public network, a carrier network for a portable telephone, or the like. Further, the server and the terminal may be connected by wired connection or wireless connection.

Further, contents of a game to which the present invention is applied are not limited specifically to any kind, and for example, the present invention can also be applied to a game system that uses VR (Virtual Reality) or AR (Augmented Reality).

Further, the specific character strings and numerical values described hereinabove and the specific character strings and numerical values in the drawings are exemplary, and such character strings and numerical values are not restrictive.

The invention claimed is:

1. A transmission apparatus comprising:
 an acquisition unit that sequentially acquires a frame image drawn in a frame buffer;
 a determination unit that determines, on a basis of a meeting of a predetermined condition concerning the frame image or a communication situation, whether or not gradual decoderrefresh is to be used for encoding the frame image;

an encode processing unit that encodes, according to the determination, the frame image into any one of an ordinary I-frame and data including an I-slice in the gradual decoder refresh; and a transmission unit that transmits the I-frame or the data including an I-slice, wherein the determination unit determines whether or not the gradual decoder refresh is to be used, on a basis of at least one of an amount of change in a scene from that of an immediately preceding frame image, the number of times by which missing of the I-frame or the data including an I-slice has occurred per unit period of time in a past, and the number of times by which the I-frame has been generated per unit period of time in the past.

2. The transmission apparatus according to claim 1, wherein the encode processing unit skips, in a case where the frame image is to be encoded into an ordinary I-frame, encoding of at least one of frame images next to the frame image.

3. The transmission apparatus according to claim 2, wherein the encode processing unit skips encoding of frame images of the number of frames which number is determined on a basis of a data size of the I-frame and a transferrable bandwidth.

4. The transmission apparatus according to claim 1, wherein the transmission unit transmits the I-frame or the data including an I-slice at a data rate according to a transferrable bandwidth.

5. A reception apparatus comprising:
a reception unit that receives image data from a transmission apparatus;
a reception buffer that stores the image data;
a decode processing unit that decodes the image data to generate an image;
a display controlling unit that causes the image to be displayed; and
a reception buffer controlling unit that secures, when the image data that is data including an I-slice in gradual decoder refresh is transmitted from the transmission apparatus, the reception buffer of a size with which displaying of the image does not underflow; wherein
the transmission apparatus determines, prior to transmission to the reception unit and on a basis of a meeting of a predetermined condition concerning the image data or a communication situation, whether or not to use gradual decoder refresh for encoding the image data, wherein the transmission unit determines whether or not the gradual decod er refresh is to be used, on a basis of at least one of an amount of change in a scene from that of an immediately preceding frame image, the number of times by which missing of the I-frame or the data including an I-slice has occurred per unit period of time in a past, and the number of times by which the I-frame has been generated per unit period of time in the past.

6. The reception apparatus according to claim 5, wherein the reception buffer controlling unit adjusts a capacity of the reception buffer on a basis of at least one of a transferrable bandwidth and a reception amount of an ordinary I-frame.

7. A transmission method comprising:
sequentially acquiring a frame image drawn in a frame buffer;
determining, on a basis of a meeting of a predetermined condition concerning the frame image or a communication situation, whether or not gradual decoder refresh is to be used for encoding the frame image;
encoding, according to the determination, the frame image into any one of an ordinary I-frame and data including an I-slice in the gradual decoder refresh; and
transmitting the I-frame or the data including an I-slice,
wherein the transmission unit determines whether or not the gradual decod er refresh is to be used, on a basis of at least one of an amount of change in a scene from that of an immediately preceding frame image, the number of times by which missing of the I-frame or the data including an I-slice has occurred per unit period of time in a past, and the number of times by which the I-frame has been generated per unit period of time in the past.

8. A reception method comprising:
receiving image data from a transmission apparatus;
decoding the image data to generate an image;
causing the image to be displayed; and
securing, when the image data that is data including an I-slice in gradual decoder refresh is transmitted from the transmission apparatus, a reception buffer of a size with which displaying of the image does not underflow, the reception buffer storing the image data; wherein
the transmission apparatus determines, on a basis of a meeting of a predetermined condition concerning the image data or a communication situation, whether or not to use gradual decoder refresh for encoding the image data prior to transmission. wherein the transmission unit determines whether or not the gradual decod er refresh is to be used, on a basis of at least one of an amount of change in a scene from that of an immediately preceding frame image, the number of times by which missing of the I-frame or the data including an I-slice has occurred per unit period of time in a past, and the number of times by which the I-frame has been generated per unit period of time in the past.

9. A non-transitory, computer readable storage medium containing a program, which when executed by a computer, causes the computer to perform a transmission method by carrying out actions, comprising:
sequentially acquiring a frame image drawn in a frame buffer;
determining, on a basis of a meeting of a predetermined condition concerning the frame image or a communication situation, whether or not gradual decoder refresh is to be used for encoding the frame image;
encoding, according to the determination, the frame image into any one of an ordinary I-frame and data including an I-slice in the gradual decoder refresh; and
transmitting the I-frame or the data including an I-slice,
wherein the transmission unit determines whether or not the gradual decod er refresh is to be used, on a basis of at least one of an amount of change in a scene from that of an immediately preceding frame image, the number of times by which missing of the I-frame or the data including an I-slice has occurred per unit period of time in a past, and the number of times by which the I-frame has been generated per unit period of time in the past.

10. A non-transitory, computer readable storage medium containing a program, which when executed by a computer, causes the computer to perform a reception method by carrying out actions, comprising:
receiving image data from a transmission apparatus;
decoding the image data to generate an image;
causing the image to be displayed; and
securing, when the image data that is data including an I-slice in gradual decoder refresh is transmitted from the transmission apparatus, a reception buffer of a size with which displaying of the image does not underflow, the reception buffer storing the image data; wherein the transmission apparatus determines, on a basis of a meeting of a predetermined condition concerning the image data or a communication situation, whether or not to use gradual decoder refresh for encoding the image data prior to transmission, wherein the transmission unit determines whether or not the gradual decod er refresh is to be used, on a basis of at least one of an amount of change in a scene from that of an immediately preceding frame image, the number of times by which missing of the I-frame or the data including an-slice has occurred per unit period of time in a past, and the number of times by which the I-frame has been generated per unit period of time in the past.

* * * * *